Patented Mar. 14, 1950

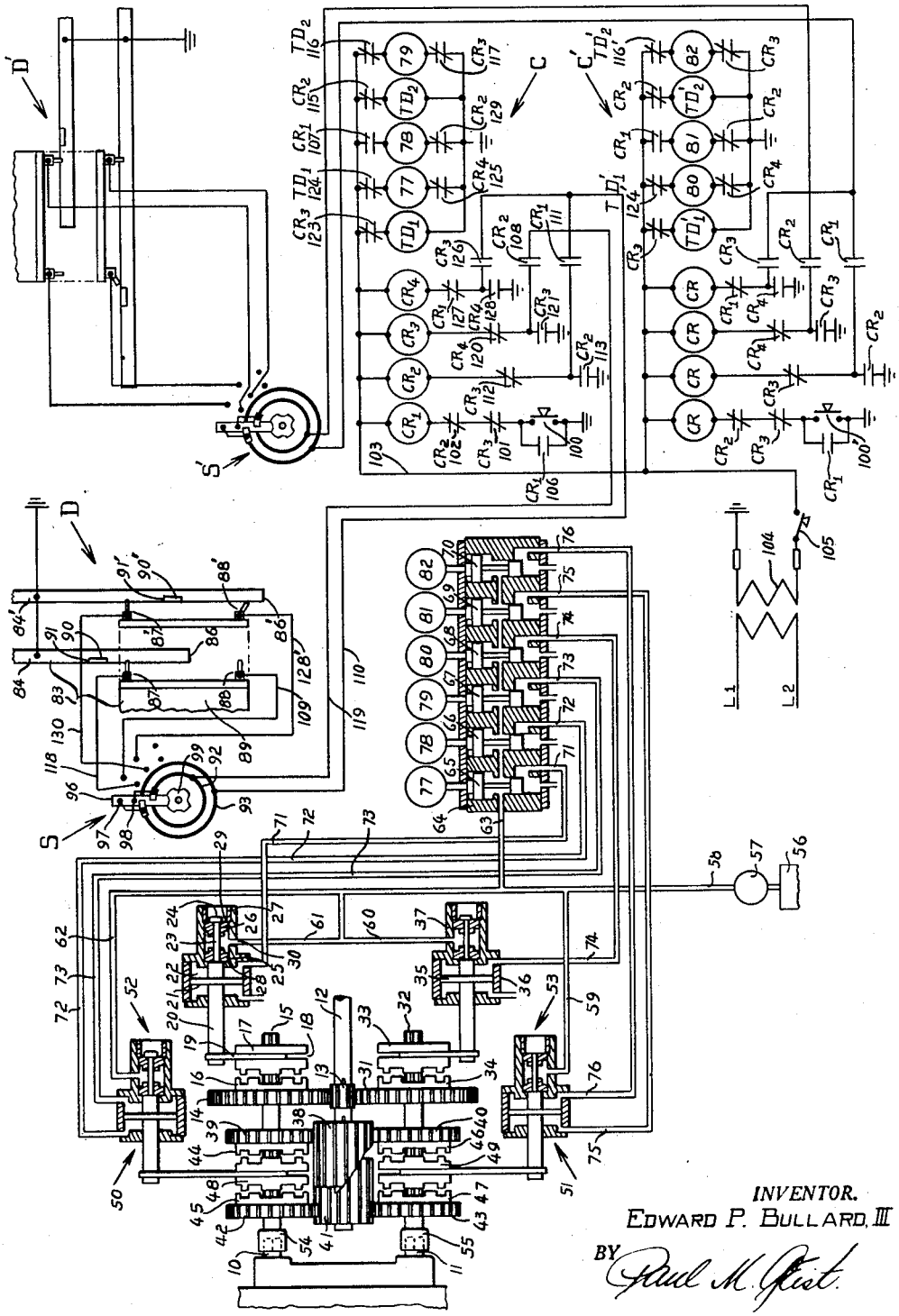

2,500,798

UNITED STATES PATENT OFFICE 2,500,798

POSITIONING APPARATUS

Edward P. Bullard, III, Fairfield, Conn., assignor to The Bullard Company, a corporation of Connecticut Application March 24, 1947, Serial No. 736,703

34 Claims. (Cl. 74—364)

1

This invention relates to apparatus for automatically positioning a member along a path of travel.

The primary object of the invention is the provision of an apparatus which can effect the movement of a member along a path to any one at a time of more than two locations, and always such that the movement is initially in the correct direction toward the selected location regardless of the previous location of the member along the path.

Other objects include, the provision of such an apparatus in which the movement of the member for any selected location is always initiated in the correct direction by an always identical, non-selective operation; the provision of such an apparatus in which the member is ultimately moved to the selected location at a relatively slow speed, although it is moved at a relatively rapid speed to an intermediate location which always bears a definite relation to the finally-selected location; the provision of such an apparatus wherein the member may be moved to more than two locations along its path of travel by a power transmission that is so controlled that upon a selection of a desired location being made and an operation initiated by a non-selective act, a further selection is automatically effected so that the member initially moves in the correct direction toward the selected location regardless of the previous location of the member along the path; and the provision of an apparatus including a member movable in two directions along a path of travel such that it can be positioned at any pre-determined location therealong and embodying a control which when rendered effective by a non-selective act automatically selects and initiates the correct direction of movement of the member toward the pre-determined location.

The above, as well as other objects and novel features of the invention will become apparent from the following specification and accompanying drawing in which the single figure represents a schematic diagram of apparatus to which the principles of the invention have been applied.

The principles of the invention are applicable to any apparatus wherein it is desired to locate a member at any one at a time of more than two locations along a path of motion. They will be described as applied to controlling the rotation of two shafts each of which may move separate members along separate paths in different planes such as is the case in a horizontal boring mill; or to move one member along intersecting paths such as is the case in universally moving a member within a single plane.

Referring to the drawing, the shafts 10, 11 are adapted to be rotated in either direction by a transmission including a drive shaft 12 that receives its power from any type of prime mover (not shown), such as an electric motor, fluid-operated rotary motor, steam turbine and the like. The shaft 12 is provided with a pinion 13 that meshes with a feed gear 14. Gear 14 is journaled on a shaft 15 and is provided with a clutch face 16 that is adapted to cooperate with a mating clutch 17. The clutch 17 is splined to shaft 15, and is provided with a groove 18 in which a clutch-shifting finger 19 is adapted to ride. Finger 19 is rigidly attached to a piston rod 20 on which a piston 21 is fixed for reciprocation within a cylinder 22.

Rod 20 is provided with a portion 23 of reduced diameter, and a nut 24 is screwed to the end opposite that to which finger 19 is attached. Two discs 25, 26 are slidably mounted on portion 23 within a cylinder 27, the ends of which include annular abutments 28, 29 against which discs 25, 26 are adapted to seat when forced apart by fluid under pressure constantly supplied therebetween through a port 30. From the figure, it is apparent that piston 21 has a greater effective area than discs 25, 26 and, therefore, admission of fluid to the cylinder 22 on the right hand side of piston 21 causes clutch 17 to engage clutch face 16 thereby causing shaft 15 to be rotated at a relatively slow speed. Release of this fluid under pressure instantly permits discs 25 and 26 to separate disengaging clutch 17 from gear 14.

Pinion 13 also meshes with another feed gear 31, journaled on a shaft 32 on which a clutch 33 is splined. The clutch 33 is caused to engage and disengage a mating clutch face 34 on gear 31 by the action of a piston 35 within a cylinder 36, and a neutralizing device 37 all in the same manner as clutch 17 is operated by piston 21 and the discs 25, 26 in cylinder 27.

The shaft 12 also supports for rotation with it a gear 38 of substantially larger diameter than pinion 13. Gear 38 meshes with a pair of gears 39, 40 that are, respectively, journaled on the shafts 15 and 32. Additionally, gear 38 meshes with a gear 41 that is journaled on a shaft, the longitudinal axis of which lies in the same horizontal plane as that for shaft 12. Gear 41 extends beyond gear 38 and meshes with a pair of gears 42, 43 also journaled on shafts 15 and 32, respectively. Gears 39, 42 and 40, 43 possess clutch faces 44, 45, 46 and 47. Double faced clutches 48 and 49 are, respectively, splined to shafts 15 and 32, and are engaged with and disengaged from their corresponding clutch faces on gears 39, 42, 40 and 43 by fluid operated piston devices 50 and 51 and neutralizing devices 52 and 53 in the same manner as piston 21 and discs 25, 26 engage and dis-engage clutch 17 with clutch face 16.

From the foregoing it is evident that shaft 15 is rotated at a relatively slow and a relatively rapid rate in one direction by engaging clutch 17 with face 16, and clutch 48 with face 44, respectively. Also that shaft 32 is rotated at a relatively slow and a relatively rapid rate in one direction, respectively, by engaging face 34 with clutch 33, and clutch 49 with face 46. Furthermore, it is evident that shaft 15 is rotated in a reverse direction by engaging clutch 48 with face 45; and shaft 32 is rotated in a reverse direction by engaging clutch 49 with face 47. Shaft 15 is provided with a socket 54 adapted to mesh with the square end of shaft 10; and shaft 32 includes a socket 55 that engages the square end of shaft 11.

For convenience in describing the principles of the invention, it is assumed that shafts 10 and 11 are in a standard horizontal boring mill; that rotation of shaft 10 by gear 14 effects vertically-upward movement of the spindle or primary means along the vertical standard of the boring mill at a relatively slow or feed rate of speed; rotation of shaft 10 by gear 39 provides vertically-upward movement of said spindle at a relatively rapid or traverse rate; and rotation of shaft 10 by gear 42 provides vertically-downward movement of said spindle at a relatively rapid or traverse rate. Additionally, the rotation of shaft 11 by gear 31 effects rightward movement of the work support or primary means of the boring mill, at a relatively slow or feed rate, as viewed from the end opposite the vertical standard and looking toward said standard; rotation of shaft 11 by gear 40 effects rightward movement of the work support, at a relatively rapid or traverse rate, in the same sense; and rotation of shaft 11 by gear 43 effects leftward movement of the work support, at a relatively rapid or traverse rate, in the same sense. From the foregoing it is evident that the term primary means includes any means which is desired to be located along a path of travel, and in the claims it is intended to cover all reasonable equivalents of tool supports, work supports and the like.

A conventional hydraulic system is employed to supply fluid, preferably oil under pressure to the various cylinders and includes a source of oil 56 that supplies a pump 57 which delivers the oil under pressure through a line 58. Branches 59, 60, 61 and 62 constantly supply each of the piston neutralizing devices at all times while the pump 57 is operating. A branch 63 delivers oil under pressure to a valve manifold 64 containing six identical valves 65, 66, 67, 68, 69 and 70. These valves include differential piston constructions such that normally they are maintained in an elevated condition which exhausts lines 71, 72, 73, 74, 75 and 76 to the atmosphere. Line 71 is adapted to supply oil under pressure to cylinder 22 on the right side of piston 21, the left hand side of which is exhausted to the atmosphere since clutch 17 is adapted to move only in one direction for effecting clutch engagement. Line 72 supplies oil to the left hand face of the piston in device 50, and line 73 supplies oil to the right hand side of said piston. Line 74 supplies oil to the right hand end of cylinder 36, while lines 75 and 76, respectively, supply oil to the left and right hand ends of the piston device 51. Valves 65 to 70 are adapted to be moved to their lower, or active positions by solenoids 77 to 82 inclusive. These solenoids are adapted to be energized in accordance with a specific cycle each time their corresponding primary means is desired to be moved to a new location.

Inasmuch as each of the primary means that is moved by the rotation of shaft 10 and 11 is positioned at different locations along its respective path of travel by identical mechanism, only one will be referred to in the following description. Two conditions can exist, either the primary means is on one or the other side of any selected location along its path of travel. So that no constructional inaccuracies will occur in positioning the primary means, it is necessary ultimately to move it always in the same direction at a relatively slow feed rate from an intermediate location to the selected location. This intermediate location always bears a fixed relation to the selected location and is at a relatively small distance therefrom. So that as little time as possible will be consumed in positioning the primary means, it is moved at a relatively rapid traverse rate to the intermediate location. In the present embodiment of the invention, a condition arises, when the primary means is initially on the same side of the selected location as the intermediate location, requiring the interposition of a secondary traverse movement of the primary means. This secondary traverse movement serves to move the primary means from the side of the selected location opposite that from the intermediate location to the proper side of the selected location prior to being moved at a relatively slow speed to the selected location. This secondary traverse movement may be eliminated, such for example in the manner shown, described and claimed in application Serial Number 736,702 filed March 24, 1947, in the name of Edward P. Bullard, III.

A detector or secondary means D comprises a unit 83 for each location within a given job to which the primary means is desired to be positioned. There may be as many units 83 as desired although twenty to thirty usually suffice for most jobs performed on such apparatus as horizontal boring mills. The units 83 in the present embodiment, include a reciprocable, manually-adjustable rod 84 that can conveniently be located so that an electrical switch-actuating surface 86 thereof can be locked in any one at a time of an infinite number of predetermined accurate positions throughout the length of the path of travel of the primary means. The units 83 also include a pair of contact making and breaking switches 87, 88 mounted on a support 89 that is rigidly attached to, and movable with the primary means. The type of switch 87, 88 is the same as that shown, described and claimed in application Serial Number 586,799, filed on April 5, 1945, in the name of Edward P. Bullard, III, to which application reference is made for specific details. As described in the above-referred-to application each switch is extremely thin so that a great many may be mounted on the support 89 within a relatively small space. Additionally, each rod 84 is relatively thin and consumes no more space than its cooperating pair of switches 87, 88, so that the twenty to thirty individually adjustable rods 84 and their cooperating switches 87, 88 consume relatively little space. In the embodiment disclosed only two rods 84, 84' and their cooperating pairs of switches are shown. Since the construction and operation for controlling vertical and horizontal motion is identical, reference will be made to the vertical control only. Since bracket 89 is rigid to and movable with the primary means, it represents its location along its path of movement. The rod 84 is shown adjusted so that the primary means lies below the selected location; while the rod 84' shows the relation when the primary means is positioned above the selected location. Rods 84, 84' are provided with trip cams 90, 90' rigidly attached to their one side. This cam is employed to actuate switches 87, 87' thereby requiring switches 87, 88 and 87', 88' to be slightly misaligned so that switches 87, 87' will cooperate with cams 90, 90' and switches 88, 88' will cooperate with the surfaces 86, 86' respectively. Cam 90 is located above surface 86 an amount that bears a fixed relation at all times to the surface 86. With bracket 89 in a position such that switch 87 is above cam 90, downward movement of the primary means will cause the end 91 of cam 90 to trip switch 87 and when this occurs switch 88 must lie a relatively short distance below the surface 86 of rod 84, and in the neighborhood of .125 inch. This location is termed, for convenience, an intermediate point or location from which the primary means must always be fed upwardly until switch 88 is tripped by surface 86 thereby stopping the primary means at the final, selected location along its path of travel. From the foregoing it is evident that adjustment of rod 84 not only accurately establishes the location of the final, selected location at which the primary means is to stop (surface 86), but also an intermediate location (end 91 of cam 90). Furthermore, it is evident that there is a fixed relation between the end 91 and the surface 86. The use of the expression "secondary means" in the claims is intended to cover not only one or more adjustable rods 84 and their cooperating pair or pairs of switches 87, 88, but all reasonable equivalents thereof, whether electro-mechanical, electro-hydraulic, hydraulic, mechanical or electronic.

Since the specific invention contemplates a relatively large number of units 83, each including a rod 84 and a pair of switches 87, 88, it also contemplates a selector or tertiary means S for selecting at the will of the operator any of the detector units one at a time. This selector, in the embodiment shown is in the form of an electrical distributor and comprises a pair of current-carrying rings 92, 93 which cooperate with brushes that are attached to a rotatable bar 96 containing a pair of wiping contacts 97, 98. The contacts 97, 98 are adapted to make wiping contact with a pair of contacts for each detector unit 83, which pairs of contacts are arranged annularly about the current-carrying rings 92, 93. In the embodiment disclosed, a handle 99 is attached to bar 96 by which manual selection of any detector unit may be effected. It is entirely within the principles of the invention to operate the selector by any mechanism as well as manually whether or not such operation is caused in a definite sequential order. Such devices may be hydraulic, electric or otherwise and they are all within the meaning of the expression "tertiary means for selecting" as used in the claims.

When a selection of one of the detector units 83 is made, by moving bar 96 manually in the present embodiment, a fourth means is provided which when operated by a non-selective act involving identical action each time it is operated, automatically selects and initiates the proper direction of motion of the primary means so that it initially moves toward the selected location regardless of its previous position. This means, in the present embodiment is a circuit C including a plurality of relays and the solenoids 77, 78 and 79 for the vertically-movable primary means, which can operate on either A. C. or D. C. current and, therefore, does not depend upon polarity. A similar circuit C', in parallel with circuit C is provided for the horizontally-movable primary means. The circuit C for the vertically-movable primary means can best be understood by describing its operation first with the primary means below the selected location and thereafter with the primary means above the selected location.

With the primary means below the selected location as defined by the surface 86, pressing push button switch 100 causes current to flow from ground through the normally closed CR₃ switch 101 and CR₂ switches 102, thence through control relay CR₁, through a conductor 103 to the secondary 104 of a transformer, thence to ground. A main switch 105 is provided for de-energizing the entire control and must, of course, be closed when operating the apparatus. Energization of relay CR₁ closes normally open CR₁ switch 106 holding CR₁ relay after release of push button switch 100. It also closes normally-open CR₁ switch 107 which energizes solenoid 78 forcing valve 66 downwardly so that oil under pressure passes from line 63 to line 72, thence to the left hand side of the piston in device 50, moving clutch 48 into mesh with clutch face 44. This causes gear 39 to rotate shaft 10 relatively rapidly so that the vertically movable primary means moves upwardly at traverse rate. This upward movement continues even though switch 87 is closed by cam 90 because at this time, no circuit can be established for switch 87 since CR₂ switch 108 is open. Upward movement of the primary means continues until switch 88 is closed by surface 86 whereupon a circuit is established from ground through rod 84, switch 88 a conductor 109, contact 97, ring 93, conductor 110, CR₁ switch 111 (which is closed since control relay CR₁ is still energized), thence through normally-closed CR₃ switch 112, control relay CR₂, line 103 through the transformer to ground. Energization of control relay CR₂ opens CR₂ switch 102 thereby de-energizing control relay CR₁ and consequently opening CR₁ switch 107 which de-energizes solenoid 78 causing valve 66 to move upwardly exhausting cylinder device 50 and permitting its neutralizing mechanism 52 to neutralize clutch 48 stopping upward movement of the vertically-movable primary means. Additionally, de-energization of control relay CR₁ effects opening of CR₁ switches 106 and 111. Energization of control relay CR₂ effects closing of CR₂ switch 113 for holding CR₂ relay energized after CR₁ switch 111 opens due to de-energization of relay CR₁. A time-delay solenoid TD₂ is normally energized through normally-closed CR₂ switch 115 so that the normally-closed time-delay TD₂ switch 116 is open. However, upon energization of control relay CR₂, solenoid TD₂ is de-energized causing TD₂ switch 116 to close after a pre-set interval so that solenoid 79 becomes energized through line 103, TD₂ switch 116 and normally-closed CR₃ switch 117. The reason for using TD₂ switch 116 is merely to prevent clutch rattle when the clutch 48 dis-engages clutch face 44 and engages clutch face 45.

Energization of solenoid 79 forces valve 67 downwardly so that oil under pressure flows through line 73 to the right hand side of the piston in device 50, effecting engagement of clutch 48 with gear 42 and causing the vertically-movable primary means to move downwardly at a rapid traverse rate. This movement is required for the present described locating action, in the present embodiment, because the primary means was initially on the same side of the selected location (surface 86) as the intermediate point which for the vertically-movable primary means is always below this surface 86 by a relatively small distance. This interposed traverse movement serves to move the primary means to the correct side of the selected location prior to being moved to the final selected location at a relatively slow feed rate. The primary means moves downwardly at traverse rate until switch 87 is closed by the upper edge 91 of cam 90 establishing a circuit from ground through bar 84, switch 87, a conductor 118, contact 98, ring 92, a conductor 119, CR$_2$ switch 108 (which is closed since control relay CR$_2$ is energized), normally closed CR$_4$ switch 120, control relay CR$_3$, conductor 103 to the transformer and ground.

Energization of control relay CR$_3$ opens normally-closed CR$_3$ switch 117 de-energizing solenoid 79 which permits valve 67 to rise thereby exhausting line 73 and device 50 so that the device 52 effects neutralization of clutch 48 causing the primary means to stop at the so-called intermediate location from which it is to be moved at a relatively slow rate to final selected location. Energization of control relay CR$_3$ also closes CR$_3$ switch 121 to hold control relay CR$_3$ after CR$_2$ switch 108 opens when the CR$_2$ relay becomes de-energized. A time-delay relay TD$_1$ has normally been energized by normally-closed CR$_3$ switch 123. Relay TD$_1$, when energized holds TD$_1$ switch 124 open. However, a predetermined time interval after opening CR$_3$ switch 123, TD$_1$ switch 124 closes energizing solenoid 77 through normally-closed CR$_4$ switch 125. Energizing solenoid 77 forces valve 65 downwardly so that oil under pressure passes from line 63 to line 71, thence to the right hand side of piston 21, effecting engagement of clutch 17 with gear 14. This causes shaft 10 to be rotated relatively slowly so that the primary means is moved upwardly away from the intermediate location at a slow feed rate, which continues until switch 88 again is closed by contacting surface 86 on rod 84. When this occurs a circuit is established from ground through bar 84 switch 88, line 109, contact 97, ring 93, conductor 110, CR$_3$ switch 126 (which is closed since relay CR$_3$ is still energized), normally-closed CR$_1$ switch 127, control relay CR$_4$, line 103, to the transformer and ground. Energization of relay CR$_4$ opens normally-closed CR$_4$ switch 125 de-energizing solenoid 77 whereupon valve 65 moves upwardly exhausting line 71 and cylinder 22 so that clutch 17 is dis-engaged by neutralizing cylinder device 27 stopping the primary means at the selected location. Energization of control relay CR$_4$ also closes a normally-open CR$_4$ switch 128 holding said relay energized until a subsequent operation of the circuit C is initiated by pushing the button 100 to energize control relay CR$_1$ at which time the CR$_1$ switch 127 is opened dropping out control relay CR$_4$.

The rod 84' is set so that the primary means as represented by bracket 89 is above the selected location defined by surface 86' of bar 84'. When this condition prevails switch 88' is closed and rides on the edge of bar 84' while switch 87' is open and above cam 90. In order to position the primary means as dictated by the setting of bar 84', it is necessary to move handle 99 so that bar 96 moves contacts 97, 98 into engagement with the contacts for switches 87', 88' that are arranged about the rings 92, 93. Pushing button 100 then energizes control relay CR$_1$ which is held by CR$_1$ switch 106 closing, as previously explained. CR$_1$ switch 111 also closes as well as CR$_1$ switch 107. Inasmuch as switch 88' is closed, a circuit is established from ground through bar 84', switch 88' a line 128', contact 97, ring 93, line 110, CR$_1$ switch 111, CR$_3$ switch 112, control relay CR$_2$, line 103, to the transformer and ground. Energization of relay CR$_2$ opens CR$_2$ switch 129 so that closing of CR$_1$ switch 107 will not cause energization of solenoid 78. Energization of control relay CR$_2$ also opens CR$_2$ switch 115 de-energizing relay TD$_2$ whereupon TD$_2$ switch 116 closes energizing solenoid 79 causing the primary means to move downwardly at traverse rate as previously explained. This downward movement continues until switch 87' is closed by the end 91' of cam 90' which establishes a circuit from ground through bar 84' switch 87' a conductor 130, contact 98, ring 92, line 119, CR$_2$ switch 108 (which is closed since control relay CR$_2$ is energized), CR$_4$ switch 120, relay CR$_3$, line 103, to the transformer and ground. Energizing control relay CR$_3$ opens CR$_3$ switch 117 de-energizing solenoid 79 which neutralizes the transmission stopping the primary means at the intermediate location. Control relay CR$_3$ also opens CR$_3$ switch 123, de-energizing relay TD$_1$ which closes TD$_1$ switch 124 thereby energizing solenoid 77 causing the transmission to move the primary means upwardly at a slow feed rate as previously described. This upward feed motion continues until switch 88' (which is now below surface 86' since the primary means is moving upwardly away from the intermediate point) is closed by contacting the surface 86'. This establishes a circuit from ground through bar 84' switch 88', conductor 128', contact 97, ring 93, line 110, CR$_3$ switch 126 (which is closed since control relay CR$_3$ is energized), CR$_1$ switch 127, control relay CR$_4$, line 103 to the transformer and ground. Energizing control relay CR$_4$ opens CR$_4$ switch 125, de-energizing solenoid 77 thereby stopping the upward movement of the primary means at the selected location. It also closes CR$_4$ switch 128 which holds the circuit for control relay CR$_4$ until a subsequent selection is initiated by pushing switch 100.

There is an identical selector S', detector D' and control circuit C' for controlling the operation of the shaft 11. This circuit C' employs the solenoids 80, 81 and 82 in place of solenoids 77, 78 and 79.

Although the various features of the new and improved positioning apparatus have been shown and described in detail to fully disclose one embodiment of the invention, it will be evident that numerous changes may be made in such details and certain features may be used without others without departing from the principles of the invention.

What is claimed is:

1. Apparatus comprising in combination, a primary means adapted automatically to be positioned at more than two final locations, one at a time, along a path of travel; a secondary means comprising more than two substantially identical units each including relatively adjustable elements for determining one of the final locations at which said primary means is to be located, all elements of each unit being separate from the elements of every other unit; a tertiary means having a position for indicating each unit of the secondary means, and a member adapted to be located in any of said positions to determine the unit of the secondary means desired; and a fourth means including a circuit independent of polarity for automatically selecting and initiating the correct direction of motion of the primary means to initially cause it to move toward the final location determined by the unit of the secondary means selected by the tertiary means.

2. Apparatus comprising in combination, a primary means adapted automatically to be positioned at more than two final locations, one at a time, along a path of travel; a secondary means comprising more than two units each including relatively adjustable elements for determining one of the final locations at which said primary means is to be located; a tertiary means having a position for indicating each unit of the secondary means, and a member adapted to be located in any of said positions to determine the unit of the secondary means desired; and a fourth means requiring a non-selective act to initiate it and including a circuit independent of polarity for automatically selecting and initiating the correct direction of motion of the primary means to initially cause it to move toward the final location determined by the unit of the secondary means selected by the tertiary means.

3. Apparatus comprising in combination, a primary means adapted automatically to be positioned at more than two final locations, one at a time, along a path of travel; a secondary means comprising more than two substantially identical units each including relatively adjustable elements for determining one of the final locations at which said primary means is to be located as well as a corresponding intermediate location, said intermediate location bearing a fixed relation to its corresponding final location; a tertiary means having a position for indicating each unit of the secondary means, and a member adapted to be located in any of said positions to determine the unit of the secondary means desired; and a fourth means including a circuit independent of polarity for automatically causing said primary means to move at a relatively rapid rate to said intermediate location, and thence at a relatively slow rate to the final location determined by the unit of the secondary means selected by the tertiary means.

4. Apparatus comprising in combination, a primary means adapted automatically to be positioned at more than two final locations, one at a time, along a path of travel; a secondary means comprising more than two units each including relatively adjustable elements for determining one of the final locations at which said primary means is to be located as well as a corresponding intermediate location, said intermediate location bearing a fixed relation to its corresponding final location; a tertiary means having a position for indicating each unit of the secondary means, and a member adapted to be located at any of said positions to determine the unit of the secondary means desired; and a fourth means requiring a non-selective act to initiate it and including a circuit independent of polarity for causing the primary means to move at a relatively rapid rate to said intermediate location, and thence at a relatively slow rate to the final location determined by the unit of the secondary means selected by the tertiary means.

5. Apparatus comprising in combination, a primary means adapted automatically to be positioned at more than two final locations, one at a time, along a path of travel; a secondary means adapted to be adjusted to determine each final location as well as an intermediate location therefor, each of said intermediate locations bearing a fixed relation to its respective final location; a tertiary means adapted to be operated to select, one at a time, any of the final locations determined by said secondary means; and a fourth means including a circuit independent of polarity and adapted to be operated to cause said primary means to move at a relatively rapid rate in either direction, depending upon the initial position of the primary means relative to said selected final location, to said intermediate location, thence at a relatively slow rate to said final location.

6. Apparatus comprising in combination, means adapted automatically to be positioned at more than two final locations, one at a time, along a path of travel; a unit for each of said final locations, each comprising a member and a circuit-making and breaking means; means providing an adjustment between said member and circuit-making and breaking means for determining one of said final locations; means providing relative movement between said member and circuit-making and breaking means proportional to the movement of said positionable means; means having a position for indicating each of said units, and a member adapted to be located in any of said positions to determine the unit desired; and means including a circuit independent of polarity for automatically selecting and initiating the correct direction of motion of the positionable means to initially cause it to move to the final location determined by the unit selected by the unit-determining means.

7. Apparatus comprising in combination, primary means adapted automatically to be positioned at more than two final locations, one at a time, along a path of travel; secondary means including more than two substantially identical units each comprising relatively adjustable elements for determining one of the final locations of said primary means, as well as an intermediate location that is always on the same side of, and bears a fixed relation to said final location; tertiary means having a position for indicating each unit of the secondary means, and a member adapted to be located in any of said positions to determine the unit of the secondary means desired; means for initially causing said primary means to move at a relatively rapid rate toward and beyond said final location to said intermediate location when said primary means initially is on the opposite side of said final selected location from said intermediate location; means for initially causing said primary means to move at a relatively rapid rate toward and beyond said final location in one direction, thence at a rapid rate toward and beyond said final location in the opposite direction to said intermediate location when said primary means initially is on the same side of said final location as said intermediate location; and means for moving said primary means from said intermediate location to said final, selected location at a relatively slow rate of speed.

8. Apparatus comprising in combination, primary means movable in two directions along a path of travel and adapted automatically to be positioned at a predetermined location therealong; secondary means comprising relatively adjustable elements for determining said predetermined location; and additional means requiring a non-selective act to initiate the actuation of said additional means and including a circuit independent of polarity and dependent upon the adjustment of the elements of said secondary means for automatically selecting and initiating the correct direction of motion of said primary means to initially cause it to move in the correct direction toward said predetermined location.

9. Apparatus comprising in combination, a primary means movable in two directions along a path of travel and adapted automatically to be positioned at a predetermined location therealong; secondary means comprising relatively adjustable elements for determining said predetermined location as well as an intermediate location, said intermediate location bearing a fixed relation to said predetermined location; and means including a circuit independent of polarity and dependent upon the adjustment of the elements of said secondary means for automatically selecting and initiating the correct direction of motion of said primary means to initially cause it to move at a relatively rapid rate to said intermediate location, and thence at a relatively slow rate to said predetermined location.

10. Apparatus comprising in combination, a primary means movable in two directions along a path of travel and adapted automatically to be positioned at a predetermined location therealong; secondary means comprising relatively adjustable elements for determining said predetermined location as well as a corresponding intermediate location bearing a fixed relation to said predetermined location; and means requiring a non-selective act to initiate it and including a circuit independent of polarity and dependent upon the adjustment of the elements of said secondary means for automatically selecting and initiating the correct direction of motion of said primary means to initially cause it to move at a relatively rapid rate to said intermediate location, and thence at a relatively slow rate to said predetermined location.

11. Apparatus comprising in combination, means movable in two directions along a path of travel and adapted automatically to be positioned at a predetermined location therealong; a member and a circuit-making and breaking means; means providing an adjustment between said member and circuit-making and breaking means for determining said predetermined location; means providing relative movement between said member and circuit-making and breaking means proportional to the movement of said positionable means; and a circuit independent of polarity and dependent upon the adjustment between said member and circuit-making and breaking means for automatically selecting and initiating the correct direction of motion of said positionable means to initially cause it to move toward said predetermined location.

12. Apparatus comprising in combination, a primary means adapted automatically to be positioned at more than two final locations, one at a time, along a path of travel; a secondary means comprising more than two units, each including relatively adjustable elements for determining one of the final locations at which said primary means is to be located; a tertiary means having a position for indicating each unit of said secondary means, and a member adapted to be located in any of said positions to determine the unit of the secondary means desired; and a relay circuit independent of polarity and adapted when rendered effective to cause said primary means to move along its path of travel in a direction depending upon the location of said primary means when said circuit is rendered effective.

13. Apparatus comprising in combination, a primary means adapted automatically to be positioned at more than two final locations, one at a time, along a path of travel; a secondary means comprising more than two substantially identical units, each including relatively adjustable elements for determining one of the final locations at which said primary means is to be located; a tertiary means having a position for indicating each unit of said secondary means, and a member adapted to be located in any of said positions to determine the unit of the secondary means desired; and a relay circuit independent of polarity and adapted to be rendered effective by a non-selective act to cause said primary means to move along its path of travel in a direction depending upon the location of said primary means when said circuit is rendered effective.

14. Apparatus comprising in combination, a primary means adapted automatically to be positioned at more than two final locations, one at a time, along a path of travel; a secondary means comprising more than two units, each including relatively adjustable elements for determining one of the final locations at which said primary means is to be located; a tertiary means having a position for indicating each unit of said secondary means, and a member adapted to be located in any of said positions to determine the unit of the secondary means desired; and a relay circuit independent of polarity that controls the movement of the primary means in accordance with the condition of the secondary means selected by the tertiary means.

15. Apparatus comprising in combination, a primary means adapted automatically to be positioned at more than two final locations, one at a time, along a path of travel; secondary means comprising more than two substantially identical units, each including a switch and switch-actuating means relatively adjustable for determining one of the final locations at which said primary means is to be located, and arranged so that said switch is open or closed depending upon the side of said final location the primary means is initially located; tertiary means having a position for indicating each unit of said secondary means, and a member adapted to be located in any of said positions to determine the unit of the secondary means desired; and a relay circuit which when rendered effective causes said primary means to move in one direction along its path of motion when said switch is open, and in the opposite direction when said switch is closed.

16. Apparatus comprising in combination, a primary means adapted automatically to be positioned at more than two final locations, one at a time, along a path of travel; secondary means comprising more than two units, each including a switch and switch-actuating means relatively adjustable for determining one of the final locations at which said primary means is to be located, and another switch and switch-actuating means for determining an intermediate location that bears a fixed relation to said final location, the arrangement being such that said final-location switch is open or closed depending upon the side of said final location said primary means is initially located; tertiary means having a position for indicating each unit of said secondary means, and a member adapted to be located in any of said positions to determine the unit of the secondary means desired; and a relay circuit adapted when rendered effective to cause said primary means to move in one direction at a relatively rapid rate when said final-location switch is open until it is closed, thence in the opposite direction at a relatively rapid rate until said intermediate location switch is closed, and finally at a relatively slow rate in the first direction until said final-location switch is again closed.

17. Apparatus comprising in combination, a primary means adapted automatically to be positioned at more than two final locations, one at a time, along a path of travel; secondary means comprising more than two units, each including a switch and switch-actuating means relatively adjustable for determining one of the final locations at which said primary means is to be located and another switch and switch-actuating means for determining an intermediate location that bears a fixed relation to said final location, the arrangement being such that said final-location switch is open or closed depending upon the side of said final location said primary means is initially located; tertiary means having a position for indicating each unit of said secondary means, and a member adapted to be located in any of said positions to determine the unit of the secondary means desired; and a relay circuit adapted when rendered effective to cause said primary means to move in one direction at a relatively rapid rate when said final-location switch is closed until said intermediate switch is closed, thence at a relatively slow speed in the opposite direction until said final-location switch is closed.

18. Apparatus comprising in combination, primary means movable in two directions along a path of travel and adapted automatically to be positioned at a predetermined location therealong; secondary means comprising relatively adjustable elements for determining said predetermined location; and a relay circuit independent of polarity and preconditioned by the adjustment of said relatively adjustable elements and rendered effective by a non-selective act to cause said primary means to move along its path of travel in a direction depending upon the location of said primary means when said circuit is rendered effective.

19. Apparatus comprising in combination, primary means movable in two directions along a path of travel and adapted automatically to be positioned at a predetermined location therealong; secondary means comprising relatively adjustable elements for determining said predetermined location; and a relay circuit independent of polarity and rendered effective by a non-selective act to control the movement of the primary means in accordance with the adjustment of the relatively adjustable elements of the secondary means when said circuit is rendered effective.

20. Apparatus comprising in combination, a primary means movable in two directions along a path of travel and adapted automatically to be positioned at a predetermined location therealong; secondary means comprising a switch and switch-actuating means relatively adjustable for determining said predetermined location, and arranged so that said switch is open or closed depending upon the side of said predetermined location the primary means is initially located; and a relay circuit adapted to be rendered effective by a non-selective act for causing said primary means to move in one direction along its path of motion when said switch is open, and in the opposite direction when said switch is closed.

21. Apparatus comprising in combination, a primary means movable in two directions along a path of travel and adapted automatically to be positioned at a predetermined final location therealong; secondary means comprising a switch and switch-actuating means relatively adjustable for determining said predetermined final location, and another switch and switch-actuating means for determining an intermediate location that bears a fixed relation to said predetermined final location, the construction and arrangement being such that said final-location switch is open or closed depending upon the side of said predetermined final location said primary means is initially located; and a relay circuit adapted to be rendered effective by a non-selective act to cause said primary means to move in one direction at a relatively rapid rate when said final-location switch is open until it is closed, thence in the opposite direction at a relatively rapid rate until said intermediate switch is closed, and finally at a relatively slow rate in the first direction until said final-location switch is again closed.

22. Apparatus comprising in combination, a primary means movable in two directions along a path of travel and adapted automatically to be positioned at a predetermined final location therealong; secondary means comprising a switch and switch-actuating means relatively adjustable for determining said predetermined final location, and another switch and switch-actuating means for determining an intermediate location that bears a fixed relation to said predetermined final location, the construction and arrangement being such that said final-location switch is open or closed depending upon the side of said predetermined final location said primary means is initially located; and a relay circuit adapted to be rendered effective by a non-selective act to cause said primary means to move in one direction at a relatively rapid rate when said final-location switch is closed until said intermediate switch is closed, thence at a relatively slow rate in the opposite direction until said final-location switch is closed.

23. In a positioning apparatus for a machine tool, a support adapted automatically to be positioned at more than two final locations, one at a time, along a path of travel; a detector comprising a substantially identical unit for each position to which said support is to be located, each unit including circuit-making and breaking elements relatively adjustable throughout the entire path of travel of the support; a selector for determining the unit of the detector desired; and a control circuit adapted to be rendered effective by a non-selective act and including means for automatically selecting and initiating the correct direction of motion of the support to initially cause it to move toward the final, selected location in accordance with the setting of the unit of the detector selected by the selector.

24. In a positioning apparatus for a machine tool, a support adapted automatically to be positioned at more than two final locations, one at a time, along a path of travel; a detector comprising a unit for each position to which said support is to be located, each unit including a circuit-making and breaking element for determining one of the final locations and another circuit-making and breaking element for determining an intermediate location that bears a fixed relation to its corresponding final location; an actuating member for each unit adapted to be adjusted relatively to its corresponding circuit-making and breaking elements throughout the extent of the path of travel of the support; a selector for determining the unit of the detector desired; and a control relay circuit independent of polarity for automatically causing said support to move at a relatively rapid rate to said intermediate location, and thence at a relatively slow rate to the final selected location determined by the setting of the unit of the detector selected by the selector.

25. In a positioning apparatus for a machine tool, a support adapted automatically to be positioned at more than two final locations, one at a time, along a path of travel; a detector having a unit for each position at which it is desired to locate said support; two switches for each unit, one for determining one of said final locations and one for determining an intermediate location for said one final location which bears a fixed relation thereto and is always located on one side thereof; a switch actuator for each unit adjustable throughout the extent of the path of travel of said support relatively to its corresponding switches; a selector for determining the unit of the detector desired; a relay circuit adapted upon operation to cause said support to move at a relatively rapid rate toward and beyond said final, selected location to said intermediate location when said support initially lies on the opposite side of said final, selected location from said intermediate location; a relay circuit adapted upon being rendered effective to cause said support to move at a relatively rapid rate toward and beyond said final, selected location in one direction, thence at a rapid rate toward and beyond said final location in the opposite direction to said intermediate location when said support initially lies on the same side of said final location as said intermediate location; and a relay circuit adapted when rendered effective to cause said support to move from said intermediate location to said final, selected location at a relatively slow rate of speed.

26. In a positioning apparatus for a machine tool, a support movable in two directions along a path of travel and adapted automatically to be positioned at a predetermined location therealong; a detector including a circuit-making and breaking element adjustable throughout the entire extent of the path of travel of said support for determining said predetermined location; and a relay circuit independent of polarity and preconditioned by the adjustment of said element and adapted upon being rendered effective by a non-selective act automatically to initially cause said support to move in the correct direction toward said predetermined location.

27. In a positioning apparatus for a machine tool, a support movable in two directions along a path of travel and adapted automatically to be positioned at a predetermined location therealong; a detector comprising circuit-making and breaking elements adjustable through the entire extent of the path of travel of said support for determining said predetermined location as well as an intermediate location which latter bears a fixed relation to said predetermined location; a relay circuit independent of polarity and adapted when rendered effective automatically to select and initiate the correction direction of motion of said support initially to cause it to move at a relatively rapid rate to said intermediate location; and a relay circuit automatically rendered effective upon said support arriving at said intermediate location for causing it to move at a relatively slow rate to said predetermined location.

28. In a positioning apparatus for a machine tool, a support adapted automatically to be positioned at more than two final locations, one at a time, along a path of travel; a detector comprising a unit for each position along said path at which said support is to be located, each unit including a switch and switch-actuator adjustable relatively to said switch throughout the extent of the path of travel of said support for determining one of the final locations, and arranged so that said switch is open or closed depending upon the side of said final location the support is initially located; a selector for determining the unit of the detector desired; and a relay circuit which when rendered effective causes said support to move in one direction along it path of motion when said switch is open, and in the opposite direction when said switch is closed.

29. In a positioning apparatus for machine tools, a support adapted automatically to be positioned at more than two final locations, one at a time, along a path of travel; a detector comprising a unit for each position at which said support is adapted to be located, each unit including one switch and switch-actuator for determining one of said final locations, and another switch and switch-actuator for determining an intermediate location that bears a fixed relation to said final location, said switches and switch-actuators being relatively adjustable throughout the extent of the path of travel of said support; a selector for determining the unit of said detector desired; a relay circuit adapted when rendered effective to cause said support to move in one direction at a relatively rapid rate, when said final location switch is open, until said final location switch closes; a relay circuit rendered effective by the closing of said final location switch for causing said support to move at a relatively rapid rate in the opposite direction until said intermediate location switch closes; and another relay circuit rendered effective by the closing of said intermediate location switch for causing said support to move at a relatively slow rate in said one direction until said final location switch is again closed.

30. In a positioning apparatus for machine tools, a support adapted automatically to be positioned at more than two final locations, one at a time, along a path of travel; a detector comprising a unit for each position at which said support is adapted to be located, each unit including one switch and switch-actuator for determining one of said final locations, and another switch and switch-actuator for determining an intermediate location that bears a fixed relation to said final location, said switches and switch-actuators being relatively adjustable throughout the extent of the path of travel of said support; a selector for determining the unit of said detector desired; a relay circuit adapted when rendered effective to cause said support to move in one direction at a relatively rapid rate when said final-location switch is closed until said intermediate switch is closed; and another relay circuit adapted to be energized upon the closing of said intermediate switch for causing said support to move in the opposite direction until said final-location switch is closed.

31. Apparatus comprising in combination, a primary means adapted automatically to be positioned at more than two final locations, one at a time, along a path of travel; a secondary means comprising more than two substantially identical units each including relatively adjustable elements for determining one of the final locations at which said primary means is to be located, all elements of each unit being separate from the elements of every other unit; a tertiary means having a position for indicating each unit of the secondary means, and a member adapted to be located in any of said positions to determine the unit of the secondary means desired; and means for initiating the movement of the primary means to cause it initially to move toward the final location determined by the unit of the secondary means selected by the tertiary means.

32. Apparatus comprising in combination, a primary means adapted automatically to be positioned at more than two substantially identical final locations, one at a time, along a path of travel; a secondary means comprising more than two units each including relatively adjustable elements for determining one of the final locations at which said primary means is to be located as well as a corresponding intermediate location, all elements of each unit being separate from the elements of every other unit, said intermediate location bearing a fixed relation to its corresponding final location; a tertiary means having a position for indicating each unit of the secondary means, and a member adapted to be located in any of said positions to determine the unit of the secondary means desired; means for causing said primary means to move at a relatively rapid rate to said intermediate location; and means for causing said primary means to move at a relatively slow rate from said intermediate location to the final location determined by the unit of the secondary means selected by the tertiary means.

33. In a positioning apparatus for a machine tool, a support adapted automatically to be positioned at more than two final locations, one at a time, along a path of travel; a detector comprising a unit for each position to which said support is to be located, each unit including circuit-making and breaking elements relatively adjustable throughout the entire path of travel of the support; a selector for determining the unit of the detector desired; and means including a circuit independent of polarity for causing said support to initially move in the correct direction toward the final, selected location in accordance with the setting of the unit of the detector selected by the selector.

34. In a positioning apparatus for a machine tool, a support adapted automatically to be positioned at more than two final locations, one at a time, along a path of travel; a detector comprising a unit for each position to which said support is to be located, each unit including a circuit-making and breaking element for determining one of the final locations and another circuit-making and breaking element for determining an intermediate location that is always on the same side of, and bears a fixed relation to its corresponding final location; an actuating member for each unit adapted to be adjusted relatively to its corresponding circuit-making and breaking elements throughout the extent of the path of travel of the support; a selector for determining the unit of the detector desired; means for causing said support to move at a relatively rapid rate to said intermediate location; and means adapted to cause said support to move at a relatively slow rate from said intermediate location to the final, selected location determined by the setting of the unit of the detector selected by the selector.

EDWARD P. BULLARD, III.

REFERENCES CITED

The following references are of record in the file of this patent:

UNITED STATES PATENTS

| Number | Name | Date |
| --- | --- | --- |
| 2,351,921 | Bullard | June 20, 1944 |
| 2,352,183 | Bullard | June 27, 1944 |
| 2,352,184 | Bullard | June 27, 1944 |
| 2,352,185 | Bullard | June 27, 1944 |
| 2,355,625 | Bullard | Aug. 15, 1944 |
| 2,384,809 | Bullard | Sept. 18, 1945 |
| 2,427,493 | Bullard | Sept. 16, 1947 |
| 2,452,443 | Elsea | Oct. 26, 1948 |

Certificate of Correction

Patent No. 2,500,798     March 14, 1950

EDWARD P. BULLARD, III

It is hereby certified that errors appear in the printed specification of the above numbered patent requiring correction as follows:

Column 6, lines 9 and 10, for "A. C. or D. C." read *alternating or direct*; column 16, line 7, for the word "correction" read *correct*; line 46, for "adaptedw" read *adapted*; column 17, line 28, strike out "substantially identical" and insert the same after the word "two" in line 31; lines 34 to 36, inclusive, strike out the comma and words ", all elements of each unit being separate from the elements of every other unit" and insert the same after the word "location" and before the semi-colon in line 38; and that the said Letters Patent should be read with these corrections therein that the same may conform to the record of the case in the Patent Office.

Signed and sealed this 25th day of July, A. D. 1950.

[SEAL]

THOMAS F. MURPHY,
*Assistant Commissioner of Patents.*